C. ZINGRE.
HORSE LAWN SHOE.
APPLICATION FILED JULY 3, 1912.
1,050,901.
Patented Jan. 21, 1913.
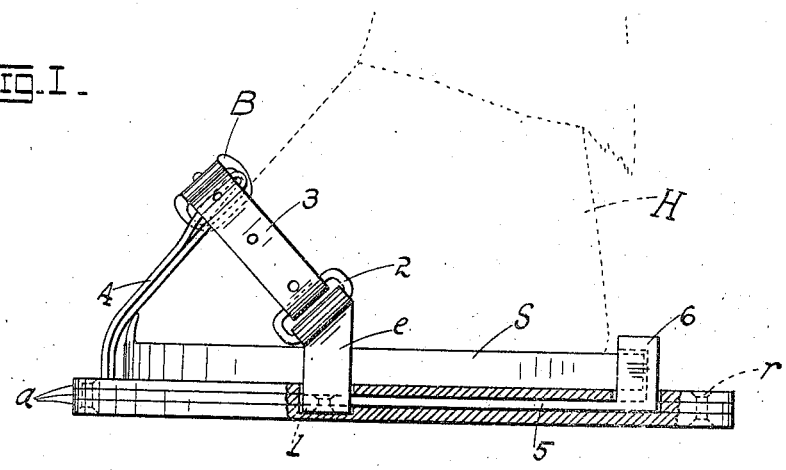
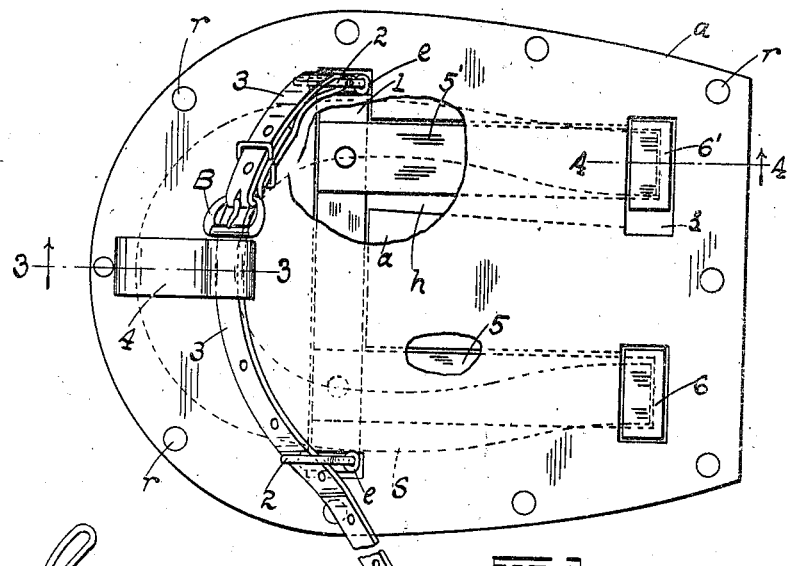
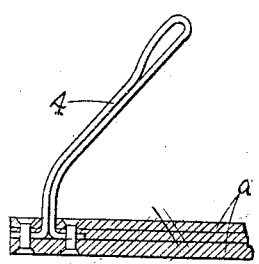
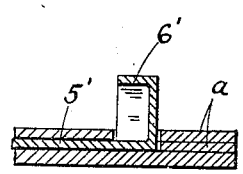
WITNESSES:
INVENTOR.
Charles Zingre.
BY
ATTORNEY.

UNITED STATES PATENT OFFICE.

CHARLES ZINGRE, OF CLAYTON, MISSOURI.

HORSE LAWN-SHOE.

1,050,901.   Specification of Letters Patent.   Patented Jan. 21, 1913.

Application filed July 3, 1912. Serial No. 707,588.

*To all whom it may concern:*

Be it known that I, CHARLES ZINGRE, citizen of the United States, residing at Clayton, in the county of St. Louis and State of Missouri, have invented certain new and useful Improvements in Horse Lawn-Shoes, of which the following is a full, clear, and exact description, reference being had to the accompanying drawings, forming a part hereof.

My invention has relation to improvements in horse lawn-shoes; and it consists in the novel details of construction more fully set forth in the specification and pointed out in the claim.

In the drawings, Figure 1 is a side elevation of a horse-shoe showing my invention applied thereto, the hoof of the animal being shown dotted; Fig. 2 is a top plan of the lawn-shoe with parts broken away, the horse-shoe being shown dotted; Fig. 3 is a sectional detail on the line 3—3 of Fig. 2, with the loop in edge view; and Fig. 4 is a sectional detail on the line 4—4 of Fig. 2.

The present invention has for its object to provide a lawn-shoe for horses (mules and other draft animals) which may be readily attached to the hoof of the animal and to the ordinary horse-shoe secured to said hoof, and as readily detached therefrom, the primary object sought being to construct a shoe which will be light, durable, and not clumsy. The chief use for such a shoe of course, is on lawns where horses are employed to draw a mower for cutting the grass, although obviously the application need not be restricted thereto.

The advantages of the shoe will be apparent from a detailed description of the invention which is as follows:—

Referring to the drawings H represents the animal's hoof, and S the ordinary horseshoe, herein shown preferably without toe or heel calks. The lawn-shoe consists of a pad composed preferably of a series of layers *a, a, a,* of leather, or equivalent material joined together by marginally disposed rivets *r* or otherwise, and of a size to fairly overlap the hoof of the animal. Extending across the front of the pad, and preferably between the bottom and the next adjacent layer *a,* is an anchor-plate 1 having outwardly deflected terminals or lugs *e, e,* projecting through the top layer of the pad, said lugs being provided with eyes or rings 2, 2, hinged to oscillate about axes disposed substantially parallel to the general dip of the face of the hoof, through which eyes a securing strap 3 may be passed, said strap being provided with an ordinary buckle B by which the length of the strap may be adjusted according to the span of the hoof H. At the front end of the shoe is disposed a central leather (or equivalent) loop 4 of sufficient length to engage the front wall of the hoof, through which loop the strap 3 is passed, and by which it is held against displacement. The loop may be riveted to the bottom layer of the pad and passed through the remaining layers or otherwise (Fig. 3).

Leading from and riveted to, one end of the plate 1 and embedded between the layers of the pad is a plate or member 5 whose free end terminates in a socket 6, passed through and projecting above the upper layer of the pad, a similar plate 5' leading from the opposite end of the plate 1, and likewise terminating in a socket 6'. The socket 6' however is passed through a transverse elongated slot *s* of the upper layer *a,* so as to permit of lateral adjustment or oscillation of the member 5' and its socket about the riveted end of the member as a pivot. While this oscillation is but slight it is sufficient to adjust the socket 6' to any width of shoe S, the purpose of the slot *s* being to permit the adjustment of the socket 6' to any shoe S which the animal may be wearing. The purpose of inclining the axes of oscillation of the rings or eyes 2, 2, is to cause said eyes to oscillate as near at right angles as possible to the pitch of the front wall of the hoof so as to better enable the flat face of the strap 3 to pass around the hoof and thus better hug the hoof. Besides, the strain, in tightening the strap, will be disposed in a plane at right angles to the pitch of the hoof as it should be.

The shoe operates as follows:—To secure the shoe to the hoof H and to the shoe S carried thereby, the attendant raises the foot of the animal to a position usual with a blacksmith in shoeing a horse: he then places the top layer or surface of the pad against the shoe S, bringing the socket 6 opposite one of the heels of the shoe S, and adjusting the opposite socket 6' (as described) so as to bring the same opposite the other heel, after which the sockets are passed over the heels, or what amounts to the same thing, the heels are slipped into their respective sockets. The attendant then passes the strap 3 (one end of which is permanently secured to one of the eyes 2) through the loop 4 and opposite eye 2, drawing it tight about the hoof, and securing the free end of the strap to the buckle B as well understood in the art. The lawn-shoe thus secured cannot become detached; it is light and is comfortable for the animal. The pad composed of the layers a, a, a, while comparatively soft, is reinforced and stiffened by the members 1, 5, 5′. Preferably, the layer a superposed over the layer which directly supports the plates 5, 5′, has sections removed therefrom to accommodate the plates, thus bringing the upper faces of the plates flush with the corresponding face of said superposed layer (the middle one in the present instance, since there are three layers), the removed portion h accommodating the plate 5′ being of sufficient width to allow for any adjustments or oscillations to which this particular plate may be subjected. These details however, are not claimed, and are merely resorted to so as to avoid a clumsy finish on the shoe, for it must be obvious that with the plates 1, 5, 5′, embedded as shown, a neat, flat lawn-shoe will result.

Having described my invention, what I claim is:—

A lawn-shoe comprising a pad composed of a series of layers, a transversely disposed plate embedded between two adjacent layers and having terminals projecting through and above the pad, rings hinged to said terminals about inclined axes conforming substantially to the pitch of the hoof, a strap connecting the rings and passed around the hoof, members leading rearwardly from the plate aforesaid and terminating in sockets above the pad, the upper layer of the pad being slotted to allow for lateral adjustment of one of the socketed members to bring the sockets opposite the heel ends of the horse shoe secured to the hoof, and a loop at the front of the pad through which the strap is passed.

In testimony whereof I affix my signature, in presence of two witnesses.

CHARLES ZINGRE.

Witnesses:
 EMIL STAREK,
 JOS. A. MICHEL.

---

Copies of this patent may be obtained for five cents each, by addressing the "Commissioner of Patents, Washington, D. C."